(12) United States Patent
Silverman et al.

(10) Patent No.: US 8,582,517 B2
(45) Date of Patent: Nov. 12, 2013

(54) DE-CORRELATION OF SUB-BANDS USING CYCLIC SHIFTS

(75) Inventors: Matthew A. Silverman, Shaker Heights, OH (US); Paul J. Stager, Akron, OH (US); John Blosco, Norton, OH (US)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 12/950,583

(22) Filed: Nov. 19, 2010

(65) Prior Publication Data

US 2012/0127929 A1  May 24, 2012

(51) Int. Cl.
*H04B 7/212* (2006.01)

(52) U.S. Cl.
USPC .......................... 370/329; 375/222; 370/328

(58) Field of Classification Search
USPC ................... 370/328–338; 375/267, 222
See application file for complete search history.

(56) References Cited

U.S. PATENT DOCUMENTS

| | | |
|---|---|---|
| 6,144,711 A | 11/2000 | Raleigh et al. |
| 6,377,631 B1 | 4/2002 | Raleigh |
| 6,452,981 B1 | 9/2002 | Raleigh et al. |
| 6,888,899 B2 | 5/2005 | Raleigh et al. |
| 6,973,134 B1 | 12/2005 | Jones, IV et al. |
| 7,095,791 B2 | 8/2006 | Jones, IV et al. |
| 7,145,971 B2 | 12/2006 | Raleigh et al. |
| 7,203,249 B2 | 4/2007 | Raleigh et al. |
| 7,555,060 B2 | 6/2009 | Raleigh et al. |
| 7,664,188 B2 | 2/2010 | Raleigh et al. |
| 7,826,560 B2 | 11/2010 | Raleigh et al. |
| 8,130,858 B1 * | 3/2012 | Lee et al. ....................... 375/267 |
| 2011/0069775 A1 * | 3/2011 | Wu et al. ....................... 375/267 |
| 2012/0087335 A1 * | 4/2012 | Baligh et al. ................... 370/330 |

* cited by examiner

*Primary Examiner* — Ricky Ngo
*Assistant Examiner* — Iqbal Zaidi
(74) *Attorney, Agent, or Firm* — Edell, Shapiro & Finnan, LLC

(57) ABSTRACT

Techniques are provided to de-correlate sub-bands of a packet to be transmitted. At a communication device, a signal (packet or frame) is generated for transmission. The packet or frame comprises a plurality of subcarriers in each of a plurality of sub-bands. Different cyclic delays are applied to the plurality of sub-bands of the signal. The signal is amplified after applying the different cyclic delays for transmission from the communication device.

14 Claims, 6 Drawing Sheets

DE-CORRELATION OF SUB-BANDS USING CYCLIC SHIFTS

TECHNICAL FIELD

The present disclosure relates to communication systems and devices.

BACKGROUND

In some communication systems, such as wireless communication systems, a packet or frame to be transmitted comprises a plurality of subcarriers in each of multiple contiguous sub-bands. When the signal is amplified for transmission, the non-linear properties of the amplifier can introduce inter-modulation distortion effects, resulting in potentially significant out-of-band emissions, creating challenges in meeting regulatory band edge restrictions. This is particularly a problem when the data modulated in the multiple contiguous sub-bands is the same data, such as is the case in certain duplicate transmission modes, e.g., in the IEEE 802.11n communication standard. As a result, in order to satisfy regulatory restrictions, the output power for these transmissions is reduced, which in turn can reduce the received signal quality at the destination device.

DESCRIPTION OF EXAMPLE EMBODIMENTS

Overview

Techniques are provided to de-correlate sub-bands of a packet to be transmitted. At a communication device, a signal (packet or frame) is generated for transmission. The packet or frame comprises a plurality of subcarriers in each of a plurality of sub-bands. Different cyclic delays are applied to the plurality of sub-bands of the signal. The signal is amplified after applying the different cyclic delays for transmission from the communication device.

Example Embodiments

Figure 1:
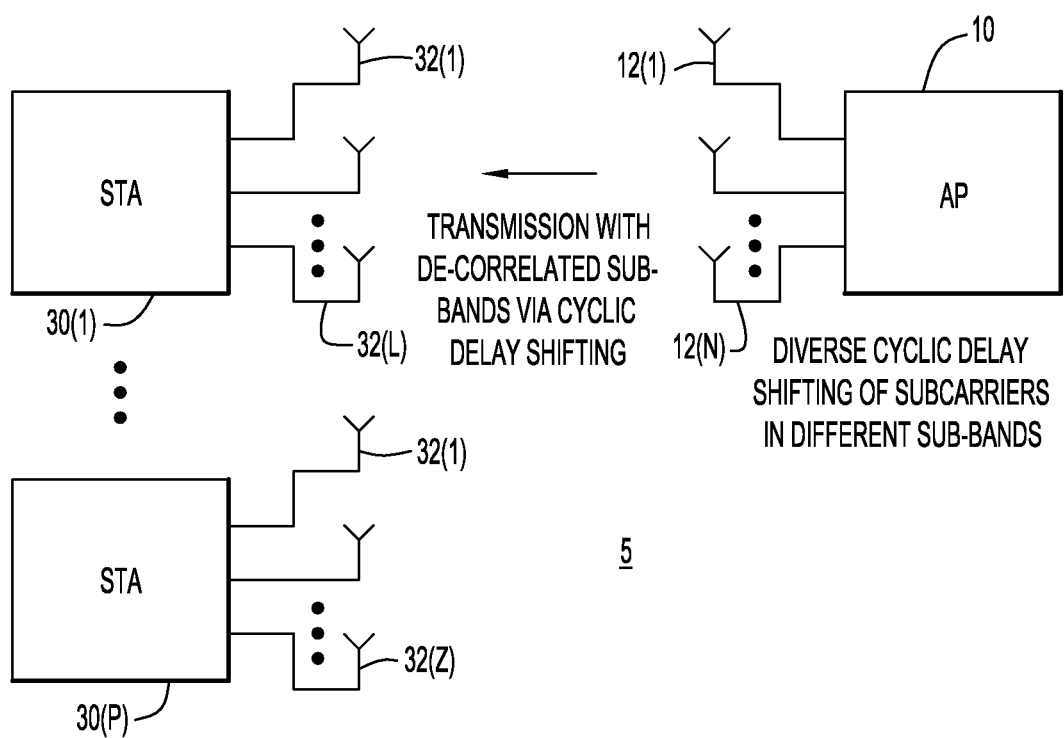
FIG. 1 is an example of a block diagram of a wireless communication system in which a wireless communication device, e.g., an access point (AP), performs diverse cyclic delay shifting of subcarriers in sub-bands according to the techniques described herein.

Referring first to FIG. 1, a wireless communication system 5 is shown comprising a first wireless communication device 10 and a plurality of second wireless communication device 30(1)-30(P). The first wireless communication device 10 is, for example, a wireless network access point (AP) or base station device and the second wireless communication devices 30(1)-30(P) are wireless network stations (STAs), also referred to herein as client devices. For example, the AP 10 and the STAs 30(1)-30(P) are configured to operate according to the IEEE 802.11n wireless communication protocol standard. This is only an example and they may be configured to operate according to any now known or hereinafter developed wireless communication technology. The AP 10 comprises a plurality of antennas 12(1)-12(N) and each STA may also comprise a plurality of antennas. Each STA need not have the same number of antennas. For example, STA 30(1) comprises a plurality of antennas 32(1)-32(L) and STA 30(P) comprises a plurality of antennas 32(1)-32(Z). Further still, while FIG. 1 shows that the AP 10 and the STAs 30(1)-30(P) have multiple antennas, this is only an example and the techniques described herein are applicable to single-antenna configurations of the AP 10 and STAs 30(1)-30(P).

According to the techniques described herein, the AP 10 is configured to generate a signal (e.g., a frame or packet) for transmission that comprises a plurality of subcarriers in each of a plurality of frequency sub-bands that occupy a frequency spectrum or bandwidth. Moreover, the AP 10 is configured perform a diverse cyclic delay shifting across subcarriers in the sub-bands. As a result, the sub-bands of the transmission are de-correlated by the cyclic delay shifting. This is particularly useful when the sub-bands are highly correlated, such as the case when the sub-bands contain the same data (i.e., they are duplicates of each other).

Figure 2:
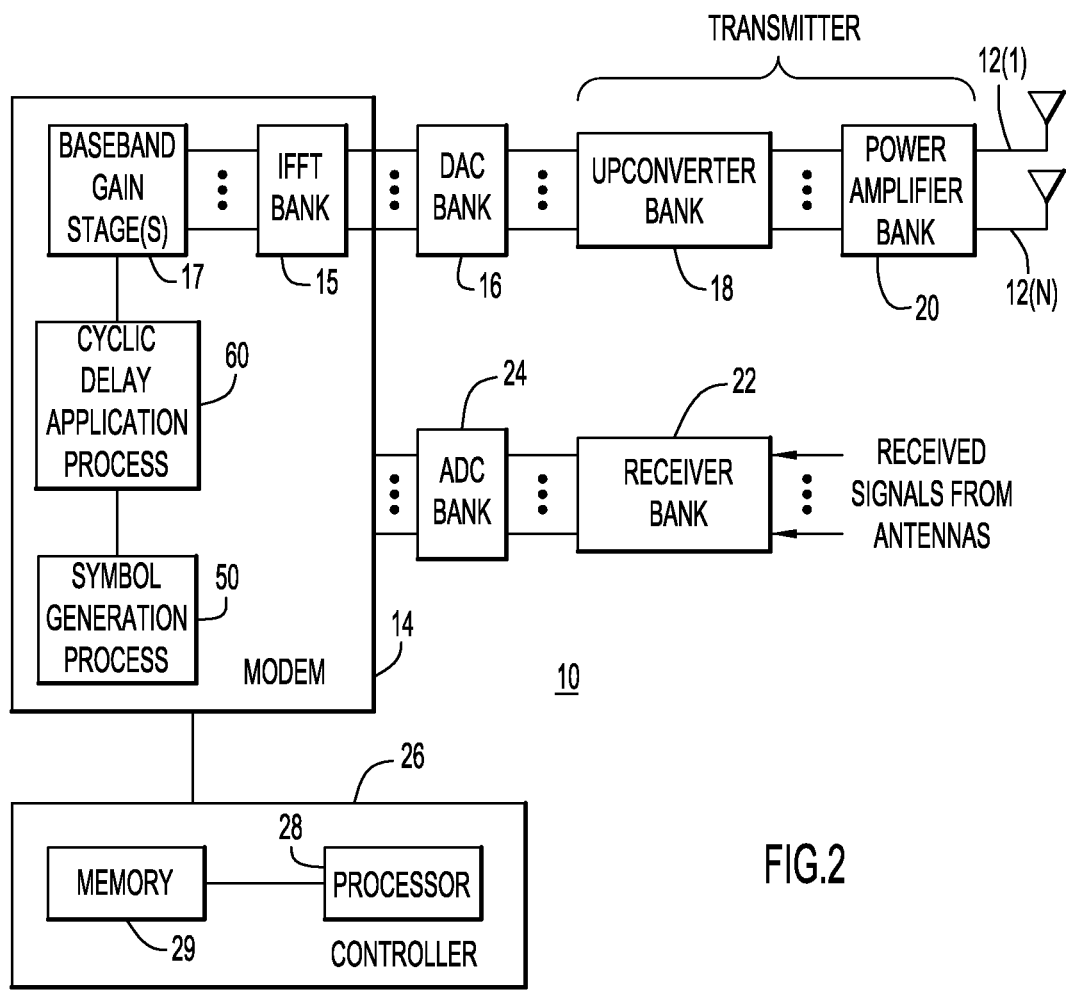
FIG. 2 is an example of a block diagram of a wireless communication device that is configured to perform diverse cyclic delay shifting of subcarriers in the sub-bands.

Reference is now made to FIG. 2. FIG. 2 illustrates an example of a block diagram of a wireless communication device configured to perform the aforementioned cyclic delay shifting operations. The device, e.g., AP 10, comprises the plurality of antennas 12(1)-12(N), a modem 14, a digital-to-analog converter (DAC) bank 16, an upconverter bank 18, a power amplifier bank 20, a receiver bank 22, an analog-to-digital converter (ADC) bank 24 and a controller 26. The modem 14 comprises an Inverse Fast Fourier Transform (IFFT) bank 15 and one or more baseband gain stages 17. In addition, the modem 14 comprises logic for a symbol generation process 50 and a cyclic delay application process 60. The controller 26 comprises a processor 38 and memory 29. The upconverter bank 18 and power amplifier bank 20 are part of a radio transmitter of the AP 10.

Generally, the modem 14 is configured to generate modulated signals (packets or frames) for transmission and to demodulate and recover data from received signals. To this end, the symbol generation process 50 in the modem 14 generates symbols at subcarriers in each of a plurality of sub-bands based on data to be transmitted that is supplied by the controller 26. The cyclic delay application process 60 involves applying different cyclic delays across subcarriers in the plurality of sub-bands. That is, the cyclic delay application process applies a first type of cyclic delay shifting across subcarriers in a first sub-band that is different from the type of cyclic delay shifting applied across subcarriers in a second sub-band, and so on. The cyclic delay application process 60 is described in further detail hereinafter in connection with FIGS. 3-5. The modem 14, and in particular the operations of cyclic delay application process 60 of the modem 14, serve as a means for applying different cyclic delays across a plurality of sub-bands of a signal (packet) to be transmitted.

The baseband gain stages 17 apply gain to the cyclic delay shifted signal output by the process 60, and then supplies the resulting gain adjusted signal to the IFFT bank 15. The diagram of FIG. 1 shows that there are multiple signal paths between the baseband gain stages 17 and the IFFT bank 15, and between subsequent components of the AP 10 in the transmit path to the antennas 12(1)-12(N) to indicate that the AP 10, in one form, employs transmit beamforming techniques for transmissions that it sends. However, this is only by way of example and not intended to be limiting as the cyclic delay shifting techniques are applicable to a single antenna AP 10, in which case the IFFT bank 15, DAC bank 16, upconverter bank 18 and power amplifier bank 20 each comprise a single element or instance.

The IFFT bank 15 converts the frequency-domain representation of the signal to be transmitted to the time-domain, and the DAC bank 16 converts the time-domain signal to an analog signal. The gain application of the baseband gain stage(s) 17 may be performed after the IFFT process of IFFT bank 15. The upconverter bank 18 serves as a means for upconverting the signal (after the different cyclic delays have been applied and prior to amplification) and comprises one or several mixers (and associated oscillators) that upmix the time-domain signal to a transmission frequency to produce an upconverted signal and the power amplifier bank 20 amplifies the upconverted signal for transmission via either a single antenna 12(1) or simultaneously via multiple antennas 12(1)-12(N). The baseband gain stage(s) 17 or the one or more power amplifiers in the power amplifier bank 20 serve as a means for amplifying the signal (packet) after the different cyclic delays have been applied to the plurality of sub-bands.

Again, as explained above, the IFFT bank 15, DAC bank 16, upconverter bank 18 and power amplifier bank 20 may comprise the multiple instances of components to perform operations for multiple instances of a signal simultaneously transmitted in the case of a transmit beamforming transmission scheme) or for a single instance of a signal to be transmitted from a single antenna and thus without beamforming. However, the signal to be transmitted comprises data that is spread across multiple subcarriers in multiple adjacent sub-bands, and as explained further hereinafter, may comprise the same modulated data on subcarriers in the multiple sub-bands. In either case, after the different cyclic delays are applied to the sub-band of the packet, the packet is supplied to a transmitter (comprising upconverter bank 18 and the power amplifier bank) for transmission.

As explained further hereinafter, the sub-bands can be completely disjoint or may overlap. While FIG. 2 shows that the cyclic delay is applied in the frequency-domain prior to IFFT processing, this is only an example. The cyclic delay can be applied in the time-domain after IFFT processing, such as when the sub-bands do not have overlapping subcarriers. However, more generally, when the sub-bands overlap in frequency, then the cyclic delay can be applied in the time-domain or frequency-domain.

The receiver bank 22 and ADC bank 24 process a signal received by the antennas 12(1)-12(N) (or by a single antenna) for demodulation by the modem 14. For simplicity, the demodulation components in the modem 14 are not shown in FIG. 1 since they are not relevant to the cyclic delay shifting techniques described herein.

In one form, the modem 14 is implemented by digital logic gates in one or more application specific integrated circuits (ASICs). Thus, the operations of the IFFT bank 15, baseband gain stages 17, symbol generation process 50 and cyclic delay application process 60 may be implemented by digital logic gates. In other forms, the modem 14 is implemented by a digital signal processor, or by software residing in memory 29 that is executed by the processor 28 of the controller 26. In this regard, the controller 26 may be configured to integrate and perform some or all of the functions of the modem 14. The memory 29 may comprise read only memory (ROM), random access memory (RAM), magnetic disk storage media devices, optical storage media devices, flash memory devices, electrical, optical, acoustical or other physical/tangible memory storage devices. In the form where the controller 26 performs the operations of the cyclic delay application process 60 (as well as other modem operations), the memory 28 may comprise one or more computer readable storage media encoded with software comprising computer executable instructions and when the software is executed operable to perform the operations described herein in connection with cyclic delay application process 60.

Figure 3:
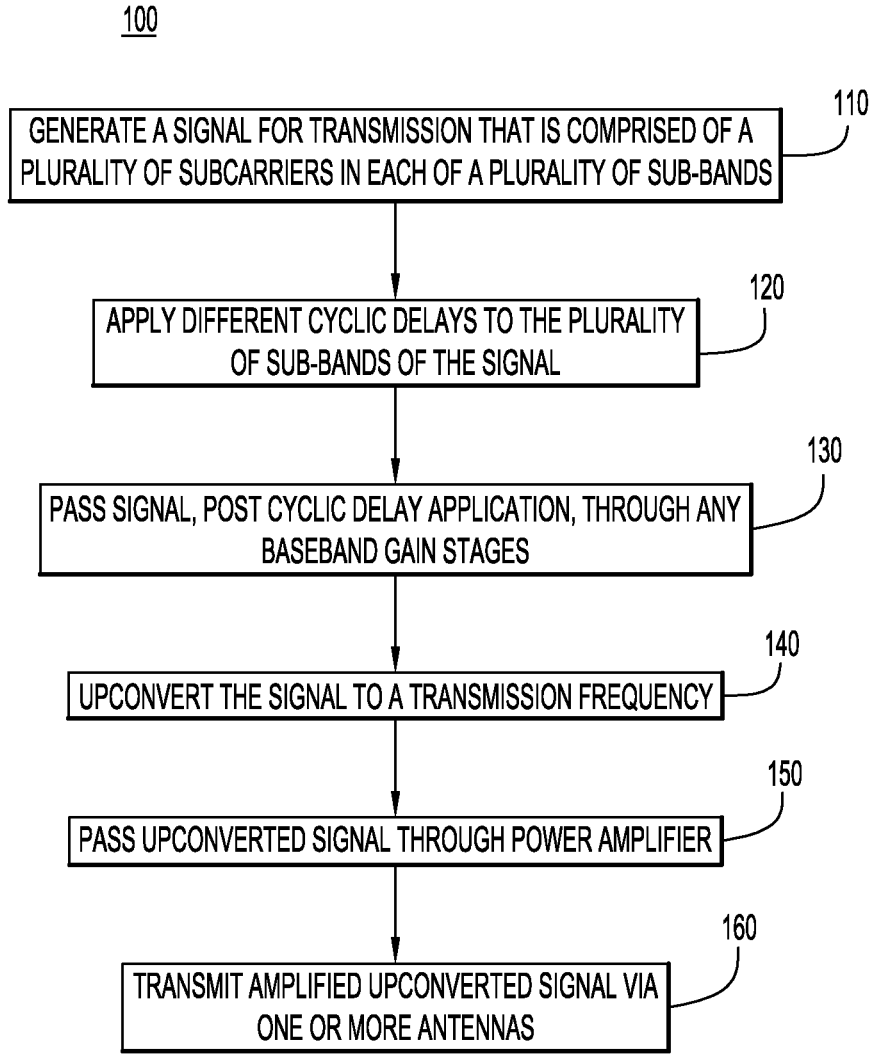
FIG. 3 is an example of a flow chart depicting a process in a wireless communication to apply diverse cyclic delay shifting of subcarriers in the sub-bands to reduce out of band emissions.
Figure 4:
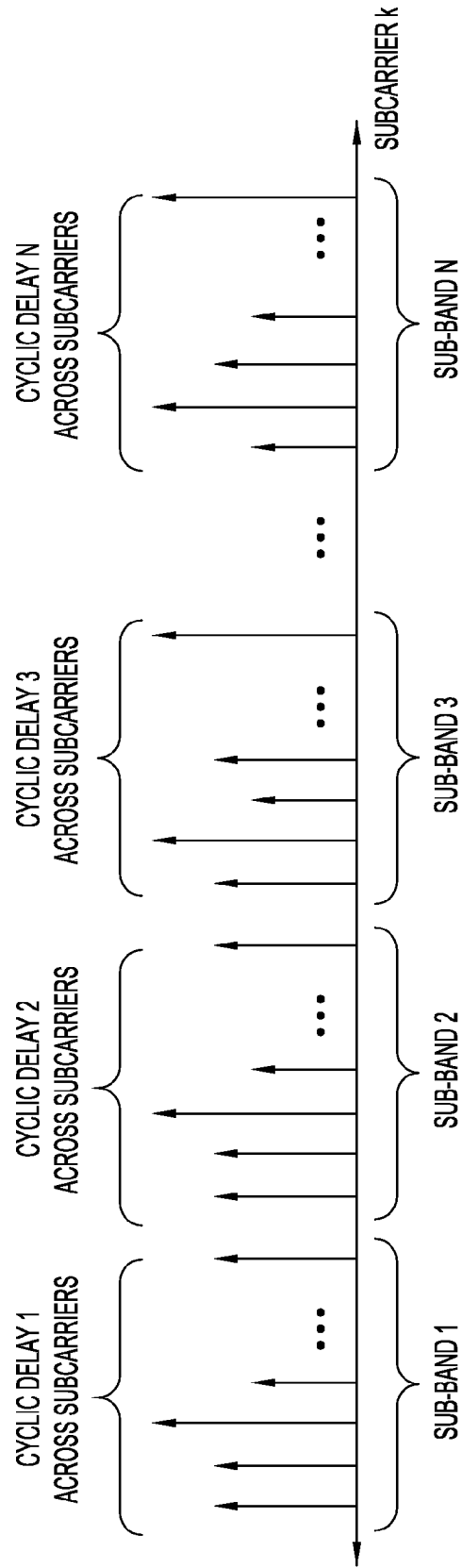
FIG. 4 is an example of a diagram depicting the application of different cyclic delay shifting across subcarriers in the sub-bands.
Figure 5:
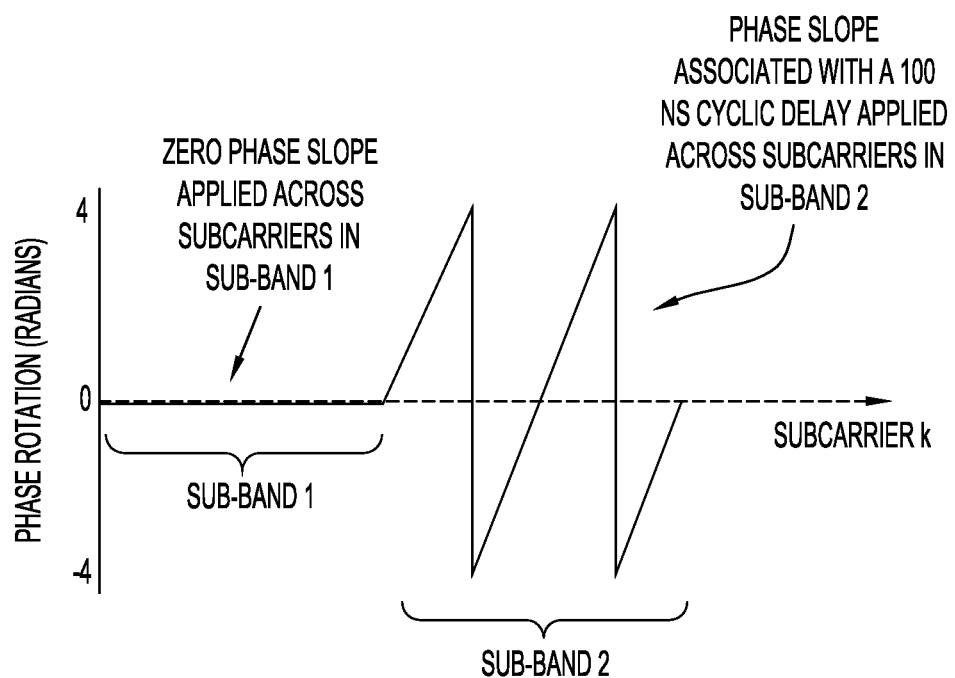
FIG. 5 is a plot illustrating application of different cyclic delay shifting by applying different phase adjustments across subcarriers in the sub-bands.

Reference is now made to FIGS. 3-5, with continued reference to FIG. 2, for a description of a transmission process 100 that employs the cyclic delay application process 60 when transmitting a signal. At 110, the modem 14 generates a signal for transmission that is comprised of a plurality of subcarriers in each of a plurality sub-bands. At 120, the modem 14 invokes the cyclic delay application process 130 to apply different cyclic delays to each of the plurality of sub-bands of the signal.

FIG. 4 shows a signal to be transmitted that comprises a plurality of sub-bands denoted sub-band 1, sub-band 2, . . . , sub-band N, and each sub-band comprises a plurality of subcarriers indicated by the upwards pointing arrows. The sub-bands 1-N occupy a frequency spectrum or bandwidth (at baseband) across a subcarrier space, where k is a subcarrier index.

In some wireless communication systems, such as an IEEE 802.11n system, there is a "Duplicate Mode" in which the same data is transmitted on subcarriers in multiple sub-bands, e.g., in first and second sub-bands. Thus, when there are only two sub-bands in the frequency band, e.g., sub-bands 1 and 2 being transmitted, then symbols on the subcarriers in sub-bands 1 and 2 are the same (as shown in FIG. 4). However, in general, there may be N sub-bands and any two or more of the sub-bands may contain the same data or all of the sub-bands may contain different data. The cyclic delay application techniques are advantageous for the situation where two or more sub-bands contain the same data (and thus have a high correlation) but they may also be applied to the situation when all of the sub-bands carry different data or the cyclic delay shifting techniques may be selectively enabled only when there is a need to de-correlate highly correlated sub-bands in a packet to be transmitted. Thus, the cyclic delay application process 60 (performed at 120 in process 100) can be activated when needed (for duplicate mode transmissions) and de-activated for normal transmissions.

Still referring to FIG. 4, the sub-bands need not be disjoint as shown in the figure. For example, a first sub-band may comprise all even numbered subcarriers (k is even) and a second sub-band may comprise all odd number subcarriers (k is odd). Thus, these two sub-bands actually overlap in frequency with each other. As explained above in connection with FIG. 2, when the sub-bands overlap in frequency, then the cyclic delay can be applied in the time-domain or frequency-domain. For example, if define sub-band 1 is defined by subcarriers k=1, 2, . . . , K and sub-band 2 is defined by subcarriers k=K+1, K+2, . . . , 2K, the frequency domain signals for sub-band 1 and 2 are $S1[k=1, 2, \ldots, K]$ and $S2[k=K+1, \ldots, 2K]$. A time-domain signal (one OFDM symbol) is generated from each sub-band by taking the IFFT of S1 and S2, to produce two time-domain sequences $s1[n]$ and $s2[n]$ each of length K. Cyclic rotation of the time-domain sequences is applied to time-domain sequences $s1[n]$ and $s2[n]$ independently and the total time-domain signal is obtained by adding s11[n]+s21[n] (after cyclic rotation is applied to them individually) in the time-domain. Mathematically this is equivalent to applying a time delay (sloped phase) across one of the sub-bands then performing an IFFT of the entire sequence k=1, 2, ..., 2K.

When operation 120 is performed, a different phase adjustment is made across the subcarriers in the respective sub-bands. The N sub-bands are de-correlated by applying different cyclic delays to each of the N sub-bands. For example, a first cyclic delay 1 is applied across the subcarriers in sub-band 1, a second cyclic delay 2 is applied across the subcarriers in sub-band 2, and so on. Again, for the simple case of two sub-bands, then it is only necessary that two types of cyclic delay be applied, or even simpler, that the subcarriers in one sub-band are not subjected to any cyclic delay shifting and the subcarriers in the other sub-band are subjected to a cyclic delay shifting. This de-correlates the sub-bands and therefore reduces any out of band emissions (OOBE) that can be caused by highly correlated transmission in multiple sub-bands.

FIG. 5 illustrates a specific example of a cyclic delay shifting operation. The de-correlation of the sub-bands is accomplished, according to one example, by applying different phase slopes across the subcarriers in each sub-band. In the example of FIG. 5, there are two sub-bands, sub-band 1 and sub-band 2. For example, the subcarriers in sub-band 1 comprise subcarriers −64 through −1 and the subcarriers in sub-band 2 comprise subcarriers 1 through 64. The subcarriers in sub-band 1 and sub-band 2 are modulated with the same data. Thus, they are duplicate sub-bands and consequently highly correlated. A 0 ("zero") degree phase slope is applied across the subcarriers in sub-band 1 and a non-zero (increasing or decreasing) phase slope associated with a 100 ns cyclic delay is applied across the subcarriers in sub-band 2. The phase adjustment across subcarriers in sub-band 2 could be non-linear as opposed to a linear one as shown in FIG. 5.

This cyclic delay shifting techniques can be extended to more than two sub-channels, subject only to a limit that is directly proportional to the symbol duration and inversely proportional to the minimum required cyclic delay difference to achieve de-correlation, i.e., $$N_{max} = \frac{T_{symbol}}{\tau_{min}}.$$

One technique to apply the cyclic delay is in the course of computing a beamforming matrix used for transmit beamforming a signal across multiple antennas at the AP. An additional phase adjustment $e^{j\Theta_k}$ is generated, where $\theta_k$ is a phase rotation angle that depends on the subcarrier index k. Thus, the phase rotated beamforming matrix is computed as:

$$V_k^{phase\_rotated} = e^{j\theta_k} V_k, \text{ such that } \theta_k = \begin{cases} 2\pi k \Delta f \tau_1 & \text{sub-band 1} \\ 2\pi k \Delta f \tau_2 & \text{sub-band 2,} \end{cases}$$

where $\Delta f$ is the sub-carrier spacing, $\tau_1$ is the cyclic delay for sub-band 1 and $\tau_2$ is the cyclic delay for sub-band 2, k is the subcarrier index, and $V_k$ is the beamforming matrix at subcarrier k across a plurality of antennas.

The result of the cyclic delay shift applied across the subcarriers in the sub-bands will mitigate out of band emissions while at the same time leaving beamforming unimpaired. This is because the same phase rotation is applied to all transmit paths (chains) for a given subcarrier, maintaining the relative phase and amplitude associated with the beamforming matrix $V_k$ across antennas.

Referring back to FIG. 3, after operation 120, the resulting signal (post cyclic delay application) is passed through any baseband gain stages, e.g., gain stages 17 shown in FIG. 2. After IFFT processing, at 140, the resulting signal is upconverted to a transmission frequency by an upconverter in upconverter bank 18. At 150, the upconverted signal is amplified by a power amplifier (e.g., in power amplifier bank 20). At 160, the resulting amplified signal is coupled to an antenna for transmission, or in the case of a beamformed transmission, the resulting amplified signals are coupled to corresponding antennas for transmission.

The process 100 depicted by the flow chart of FIG. 3 involves, at a communication device, generating a signal for transmission that comprises a plurality of subcarriers in each of a plurality of sub-bands; applying different cyclic delays to the plurality of sub-bands of the signal; and amplifying the signal after applying the different cyclic delays for transmission from the communication device.

In addition, as depicted in FIG. 2 in connection with FIGS. 3-5, an apparatus is provided comprising a modem configured to generate a signal for transmission that comprises a plurality of subcarriers in each of a plurality of sub-bands and to apply different cyclic delays to the plurality of sub-bands of the signal; and an amplifier configured to amplify the signal after the different cyclic delays have been applied to the plurality of sub-bands to produce an amplified signal for transmission.

Moreover, as also depicted in FIG. 2 in connection with FIGS. 3-5, in an other form, also provided herein is one or more computer readable storage media encoded with software comprising computer executable instructions and when the software is executed operable to: generate a packet for transmission that comprise a plurality of subcarriers in each of a plurality of sub-bands; apply different cyclic delays to the plurality of sub-bands; and supply the packet after applying the different cyclic delays to a transmitter in a communication device for transmission.

The cyclic delay shifting techniques described herein de-correlate the sub-bands and thereby reduce intermodulation effects caused by non-linear distortion associated with the power amplifier, and consequently eliminate out of band emissions in duplicate mode transmissions. These techniques can be applied to any transmission where there is high correlation between two or more sub-bands and thus has utility in many communication systems in addition to an IEEE 802.11n system.

Figure 6:
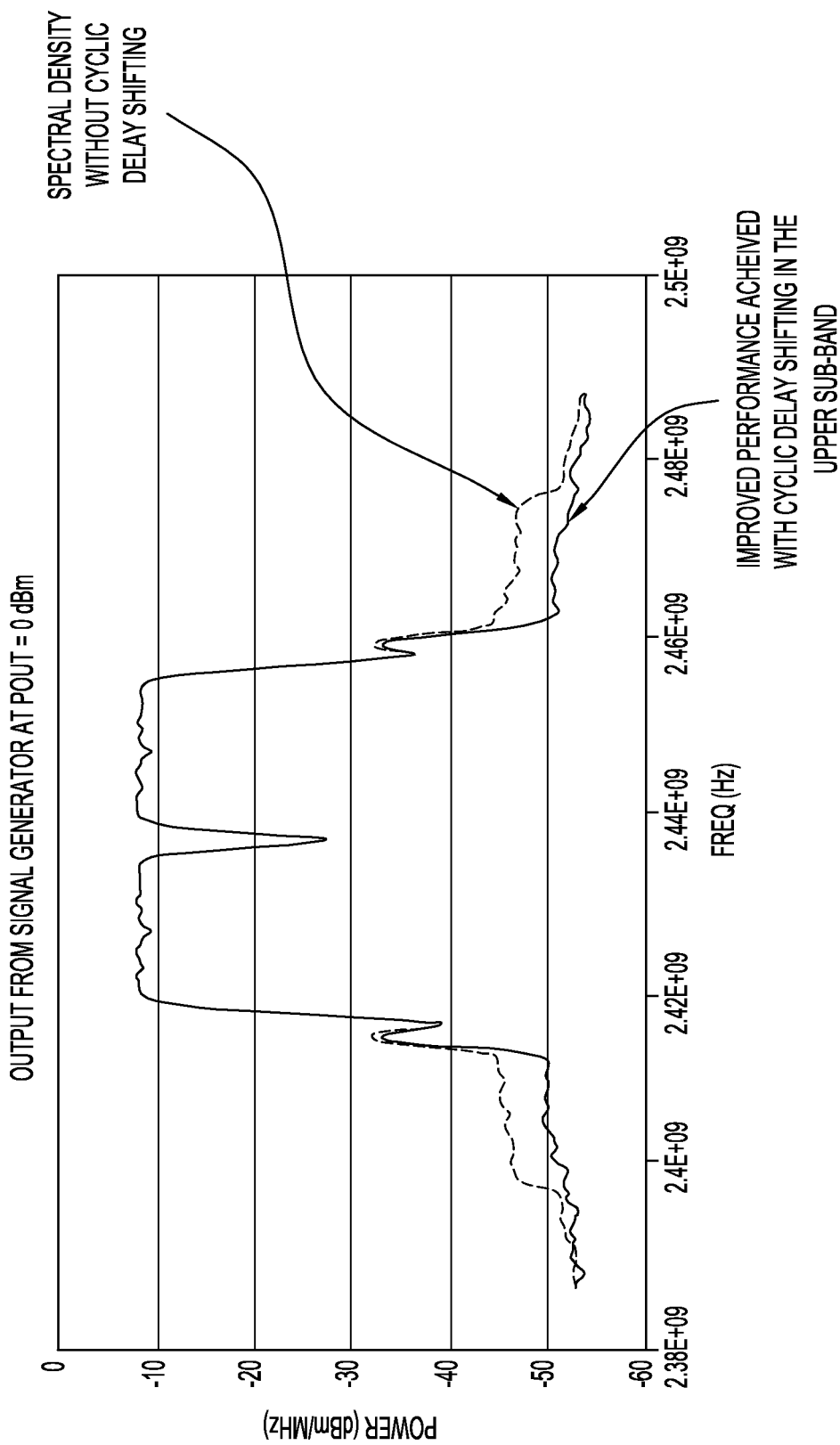
FIG. 6 is an example of a plot illustrating the improvements achieved using the techniques described herein.

Reference is now made to FIG. 6. FIG. 6 shows spectral measurements made using the cyclic delay shifting techniques described herein where 0 dB output power is applied by a power amplifier. This figure shows that there is approximately a 5 dB improvement in out of band emissions using the cyclic delay shifting techniques over a duplicate mode transmission that does not use this technique. It is also noteworthy that applying a cyclic shift to only one of the sub-bands does not impact packet error rates.

The above description is intended by way of example only.

What is claimed is:
1. A method comprising:
   at a communication device, generating a signal for transmission that comprises a plurality of subcarriers in each of a plurality of sub-bands, by modulating the subcarriers in each of the plurality of sub-bands with the same data causing the plurality of sub-bands to be highly correlated with each other;

applying different cyclic delays to the plurality of sub-bands of the signal to de-correlate the plurality of sub-bands, wherein the applying comprises applying a different phase adjustment $e^{j\theta_k}$ across the subcarriers in the respective sub-bands such that $$\theta_k = \begin{cases} 2\pi k \Delta f \tau_1 & \text{sub-band 1} \\ 2\pi k \Delta f \tau_2 & \text{sub-band 2,} \end{cases}$$

wherein $\Delta f$ is the subcarrier spacing, $\tau_1$ is the cyclic delay for a first sub-band 1 and $\tau_2$ is the cyclic delay for a second sub-band 2, and k is the subcarrier index; and amplifying the signal after applying the different cyclic delays for transmission from the communication device.

2. A method, comprising:

at a communication device, generating a signal for transmission that comprises a plurality of subcarriers in each of a first sub-band and a second sub-band, by modulating the subcarriers in each of the first and second sub-bands with the same data causing the first and second sub-bands to be highly correlated with each other;

applying different cyclic delays to the first and second sub-bands of the signal to de-correlate the first and second sub-bands, wherein the applying comprises applying a different phase adjustment across the subcarriers in the respective first and second sub-bands such that a zero phase adjustment is applied across the subcarriers in the first sub-band and a linearly sloped phase adjustment is applied across the subcarriers in the second sub-band; and amplifying the signal after applying the different cyclic delays for transmission from the communication device.

3. The method of claim 1, wherein amplifying comprises amplifying the signal with a power amplifier, and wherein applying comprises applying the different cyclic delays to de-correlate the sub-bands and thereby reduce intermodulation effects caused by non-linear distortion associated with the power amplifier.

4. The method of claim 3, and further comprising upconverting the signal after applying the different cyclic delays and before the amplifying, and further comprising coupling an amplified signal resulting from amplifying with the power amplifier to an antenna for wireless transmission from the communication device.

5. The method of claim 1, wherein generating comprises generating a high throughput duplicate mode transmission comprising the same data modulated on sub-carriers in each of first and second sub-bands.

6. An apparatus comprising:

a modem configured to generate a signal for transmission that comprises a plurality of subcarriers in each of a plurality of sub-bands, to modulate the subcarriers in each of the plurality of sub-bands with the same data resulting in the plurality of sub-bands being highly correlated with each other, and to apply different cyclic delays to the plurality of sub-bands of the signal to de-correlate the plurality of sub-bands, wherein the modem is configured to apply a different phase adjustment, $e^{j\theta_k}$ across the subcarriers in the respective sub-bands such that $$\theta_k = \begin{cases} 2\pi k \Delta f \tau_1 & \text{sub-band 1} \\ 2\pi k \Delta f \tau_2 & \text{sub-band 2,} \end{cases}$$

wherein $\Delta f$ is a subcarrier spacing, $\tau_1$ is the cyclic delay for a first sub-band 1 and $\tau_2$ is the cyclic delay for a second sub-band 2, and k is the subcarrier index; and an amplifier configured to amplify the signal after the different cyclic delays have been applied to the plurality of sub-bands to produce an amplified signal for transmission.

7. The apparatus of claim 6, and further comprising an upconverter configured to upconvert the signal after the different cyclic delays and prior to amplification by the amplifier.

8. The apparatus of claim 6, wherein the modem is configured to apply zero phase adjustment across subcarriers in a first sub-band and a linearly sloped phase adjustment across subcarriers in a second sub-band.

9. The apparatus of claim 6, wherein the modem is configured to apply the different cyclic delays to de-correlate the sub-bands and thereby reduce intermodulation effects caused by non-linear distortion associated with the amplifier.

10. The apparatus of claim 6, wherein the amplifier is a power amplifier configured to amplify the signal after the different cyclic delays have been applied for wireless transmission.

11. One or more non-transitory computer readable storage media encoded with software comprising computer executable instructions and when the software is executed operable to:

generate a signal for transmission that comprises a plurality of subcarriers in each of a plurality of sub-bands, by modulating the subcarriers in each of the plurality of sub-bands with the same data resulting in the plurality of sub-bands being highly correlated with each other;

apply different cyclic delays to the plurality of sub-bands to de-correlate the plurality of sub-bands, wherein the instructions that are operable to apply comprise instructions that are operable to apply a different phase adjustment across the subcarriers in the respective sub-bands such that a zero phase adjustment is applied across subcarriers in a first sub-band of the plurality of sub-bands and a linearly sloped phase adjustment is applied across subcarriers in a second sub-band of the plurality of sub-bands; and supply the signal after applying the different cyclic delays to a transmitter in a communication device for transmission.

12. The non-transitory computer readable storage media of claim 11, wherein the instructions that are operable to apply comprise instructions that are operable to apply different cyclic delays to de-correlate the sub-bands and thereby reduce intermodulation effects caused by non-linear distortion associated with a power amplifier in the transmitter of the communication device.

13. An apparatus comprising:

means for generating a signal for transmission that comprises a plurality of subcarriers in each of a plurality of sub-bands by modulating the subcarriers in each of the plurality of sub-bands with the same data resulting in the plurality of sub-bands being highly correlated with each other;

means for applying different cyclic delays to the plurality of sub-bands to de-correlate the plurality of sub-bands, wherein the means for applying is configured to apply a different phase adjustment across the subcarriers in the respective sub-bands such that a zero phase adjustment is applied across subcarriers in a first sub-band of the plurality of sub-bands and a linearly sloped phase adjustment is applied across subcarriers in a second sub-band of the plurality of sub-bands; and means for amplifying the signal after the different cyclic delays have been applied to the plurality of sub-bands.

14. The apparatus of claim 13, and further comprising means for upconverting the signal after the different cyclic delays have been applied and prior to amplification by the means for amplifying.

* * * * *